US012637818B2

(12) United States Patent
Almarouf

(10) Patent No.: US 12,637,818 B2
(45) Date of Patent: May 26, 2026

(54) APPARATUS AND SYSTEM OF SAND REMOVAL TO PREVENT SAND ENCROACHMENT

(71) Applicant: Abdullah Ali Almarouf, Riyadh (SA)

(72) Inventor: Abdullah Ali Almarouf, Riyadh (SA)

( * ) Notice: Subject to any disclaimer, the term of this patent is extended or adjusted under 35 U.S.C. 154(b) by 57 days.

(21) Appl. No.: 18/408,723

(22) Filed: Jan. 10, 2024

(65) Prior Publication Data

US 2025/0223765 A1     Jul. 10, 2025

(51) Int. Cl.
*E01H 1/08* (2006.01)
*G06V 20/40* (2022.01)
(52) U.S. Cl.
CPC ... *E01H 1/0836* (2013.01); *E01H 2001/0881* (2013.01); *G06V 20/41* (2022.01)
(58) Field of Classification Search
None
See application file for complete search history.

(56) References Cited

U.S. PATENT DOCUMENTS

| | | | | |
|---|---|---|---|---|
| 4,457,043 A | * | 7/1984 | Oeberg | E01H 1/0845 |
| | | | | 15/352 |
| 2014/0017018 A1 | * | 1/2014 | Blais | E01H 1/0836 |
| | | | | 406/146 |
| 2022/0097236 A1 | * | 3/2022 | Bellinger | A47L 9/2852 |

* cited by examiner

*Primary Examiner* — Kaj K Olsen
*Assistant Examiner* — Pradhuman Parihar

(57) ABSTRACT

The present disclosure provides an apparatus and a system of removing sand to prevent sand encroachment. In an embodiment, the apparatus can include a main arm (101), a movable arm (102) connected to one end of the main arm (101), and a plurality of flexible robotic arms (103) connected to the movable arm (102). The plurality of flexible robotic arms (103) can include a suction end with vacuum means for suctioning out grains of sand from a location.

13 Claims, 6 Drawing Sheets

100B

103

103C

103B

103A

200

300 ⬎

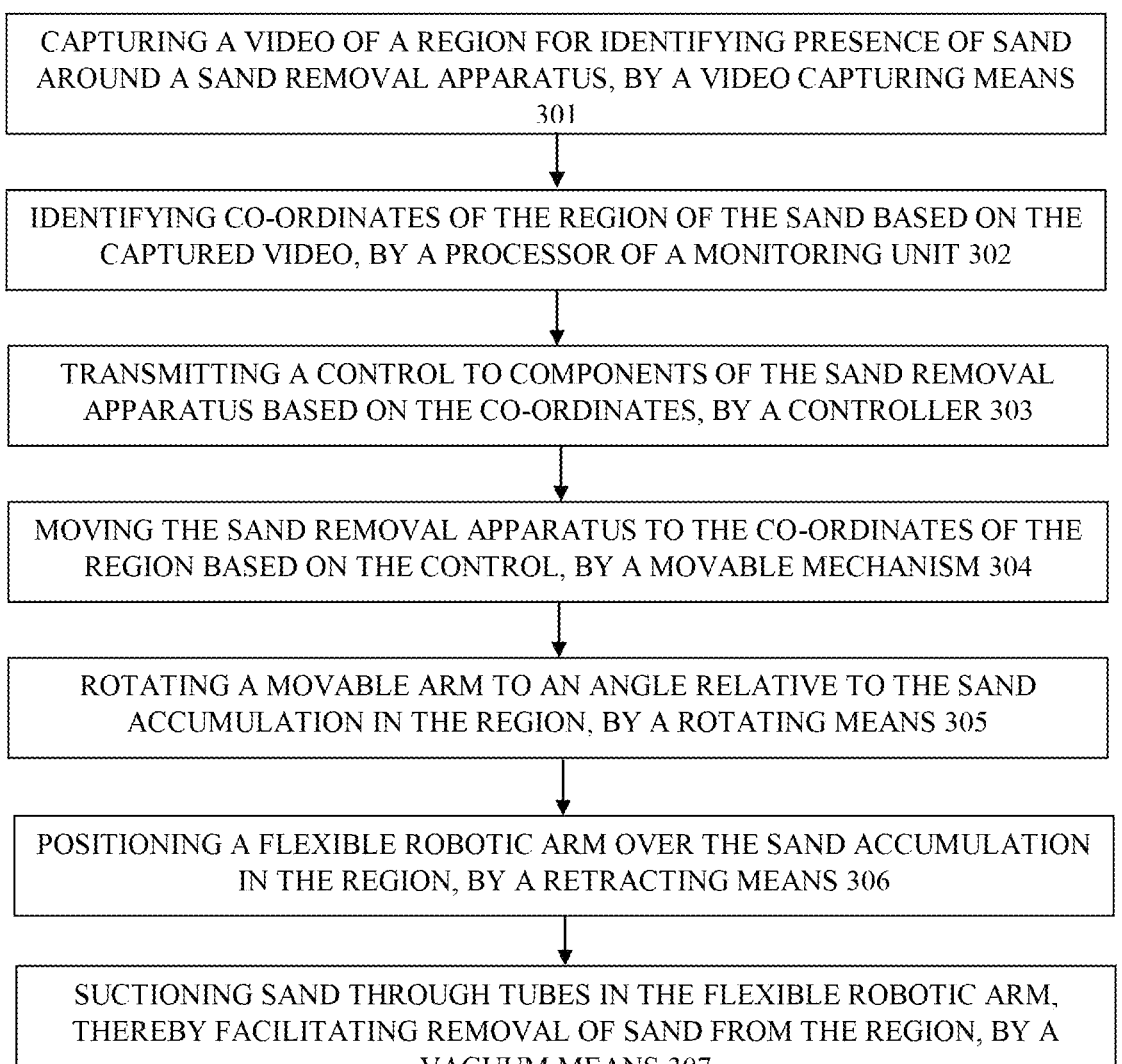

CAPTURING A VIDEO OF A REGION FOR IDENTIFYING PRESENCE OF SAND AROUND A SAND REMOVAL APPARATUS, BY A VIDEO CAPTURING MEANS 301

IDENTIFYING CO-ORDINATES OF THE REGION OF THE SAND BASED ON THE CAPTURED VIDEO, BY A PROCESSOR OF A MONITORING UNIT 302

TRANSMITTING A CONTROL TO COMPONENTS OF THE SAND REMOVAL APPARATUS BASED ON THE CO-ORDINATES, BY A CONTROLLER 303

MOVING THE SAND REMOVAL APPARATUS TO THE CO-ORDINATES OF THE REGION BASED ON THE CONTROL, BY A MOVABLE MECHANISM 304

ROTATING A MOVABLE ARM TO AN ANGLE RELATIVE TO THE SAND ACCUMULATION IN THE REGION, BY A ROTATING MEANS 305

POSITIONING A FLEXIBLE ROBOTIC ARM OVER THE SAND ACCUMULATION IN THE REGION, BY A RETRACTING MEANS 306

SUCTIONING SAND THROUGH TUBES IN THE FLEXIBLE ROBOTIC ARM, THEREBY FACILITATING REMOVAL OF SAND FROM THE REGION, BY A VACUUM MEANS 307

FIG. 3

APPARATUS AND SYSTEM OF SAND REMOVAL TO PREVENT SAND ENCROACHMENT

FIELD

The embodiments herein generally relate to removing sand along roads and other pathways. More particularly, the disclosure relates to an apparatus and a system for removing sand from the side of roads and pathways to prevent sand encroachment.

BACKGROUND AND PRIOR ART

Sand encroachment is a hazardous environmental condition that occurs in desert regions. Sand encroachment occurs when grains of sand are carried by heavy winds and deposited on roads and other pathways such as train tracks etc. Sand encroachment can have disastrous consequences wherein it can bury roads, oases, vegetation, irrigation channels etc. Further, sand encroachment can endanger drivers and pedestrians travelling through such routes.

Currently, most of the countries in desert region utilize sand removal trucks. The sand removal trucks are dump trucks that require shifting sand in each pathway. However, the trucks require a significant amount of time for clearing sand from a given area. Moreover, the trucks need to be stationed on crucial roadways and other areas, wherein non-visibility of the truck can cause fatal accidents. Also, such trucks cause major hindrances for free movement of traffic.

Therefore, there is a need for an apparatus for an efficient and quick removal of sand for preventing encroachment. Moreover, there is a need for an apparatus and a system utilizing artificial intelligence for safely shifting sand from pathway in a desert region without manual intervention.

OBJECTS

Some of the objects of the present disclosure are described herein below:

The main objective of the present disclosure is to provide an apparatus and a system for removal of sand at a location in dessert region.

Another objective of the present disclosure is to provide an apparatus and a system for efficient removal of sand at a location.

Still another objective of the present disclosure is to provide an apparatus and a system for faster removal of sand at a location.

Yet another objective of the present disclosure is to provide an apparatus and a system utilizing artificial intelligence for autonomous removal of sand at a location.

The other objectives and advantages of the present disclosure will be apparent from the following description when read in conjunction with the accompanying drawings, which are incorporated for illustration of preferred embodiments of the present disclosure and are not intended to limit the scope thereof.

SUMMARY

In view of the foregoing, an embodiment herein provides an apparatus and system of sand removal in a desert region.

In accordance with an embodiment, the apparatus can include a main arm, at least one movable arm connected to one end of the main arm, and a plurality of flexible robotic arms connected to the movable arm. The plurality of flexible robotic arms can include a suction end with vacuum means for suctioning out grains of sand from a location.

In accordance with an embodiment, the system can include but not limited to a monitoring unit, a controlling unit, a rotating means, a retracting means, and a vacuum means. The monitoring unit can be provided for monitoring parameters including presence of sand, volume of sand, location of sand and transmitting the parameters to the controlling unit. The controlling unit can be provided for controlling operation of the rotating means, the retracting means, and the vacuum means based on the parameters. The rotating means can be connected to the movable arm for facilitating movement of the movable arm relative to the main arm. The retracting means can be connected to the flexible robotic arm for facilitating folding and retraction of the flexible relative arm. The vacuum means can be provided for facilitating suctioning of the grains of sand from the location.

In accordance with an embodiment, the apparatus for removing sand to prevent sand encroachment comprises the following. A main arm extending between a first region and a second region. A movable arm connected to a first end of the main arm, wherein the movable arm is rotatable relative to the main arm. A plurality of flexible robotic arms connected to the movable arm, wherein the flexible robotic arms extend over the first region to remove sand. A tube extending internally through each of the flexible robotic arms, wherein the plurality of tubes are connected to a single tube extending internally through the movable arm, the main arm, and an exhaust arm. A controller operatively connected to the movable arm and the flexible robotic arms for controlling position of the movable arm and the flexible robotic arms relative to the first region. A vacuum means fixed in the tubes of the flexible robotic arm for generating vacuum to remove sand from the first region. The sand transferred through the tubes from the flexible robotic arms to the exhaust arm. The exhaust arm connected to the second end of the main arm. The tube in the exhaust arm releasing the sand to the second region, thereby preventing sand encroachment.

In an embodiment, a rotary motor can be provided connected to the movable arm, wherein the controller can control the rotary motor, thereby moving the movable arm to a position relative to the main arm. The rotary motor capable of rotating the movable arm at an angle in a range of 1° to 360° relative to the main arm.

In accordance with an embodiment, the robotic flexible arm can include an upper arm and a lower arm, wherein the upper arm can be movable relative to the lower arm. In an embodiment, a rotary motor can be connected to the upper arm of the flexible robotic arm, wherein the rotary motor can enable rotary movement of the upper arm relative to the lower arm.

In an embodiment, a retracting means can be connected to the flexible robotic arm for controlling movement of the flexible robotic arm relative to the movable arm for positioning the flexible robotic arm over the sand accumulation in the first region.

In an embodiment, the retracting means can include but not limited to a telescopic arm and rotary mechanism. In an embodiment, the rotary mechanism can include a string wound to a rotary motor, and an end of the string connected to the flexible rotary arm. The rotation of the rotary motor can facilitate upward and downward movement of the flexible robotic arm relative to the first region.

In an embodiment, a movable mechanism can be connected to ends of the movable arm for moving the apparatus and positioning along the first region and the second region. The movable mechanism can include but not limited to wheels, chain track wheels.

In accordance with an embodiment, a system for removing sand to prevent sand encroachment using the apparatus can include the following. A video capturing means for capturing a video in a region to monitor sand accumulation. The video capturing unit can transmit the captured video to a processing unit through a communication network. The processing unit can identify presence of sand accumulation for defining the first region by determining co-ordinates of the first region for positioning the apparatus. A controlling unit including a controller can be connected to the monitoring unit through a communication network. The controller can be provided for controlling the movable mechanism, the rotating means, and the retracting means for positioning the apparatus relative to the first region based on the co-ordinates received from the processing unit. The movable mechanism can be provided for moving the apparatus to the co-ordinates of the first region based on control received from the controller. The rotating means can rotate the movable arm for positioning relative to the sand accumulation based on control received from the controller. The retracting means can move the flexible rotating arm for positioning over the sand accumulation based on control received from the controller. A vacuum means can be controlled by the controller for switching ON and suctioning sand from the sand accumulation at the first region, thereby removing sand from the first region.

In an embodiment, the processing unit can include a processor and a memory for performing image processing to identify presence of sand accumulation in the captured video and defining determining co-ordinates of the first region.

In accordance with an embodiment, a method of removal of sand to prevent sand encroachment can comprise the following steps. First, capturing a video of a region for identifying presence of sand accumulation, by a video capturing means. Then, identifying co-ordinates of the region of the sand accumulation based on the captured video, by a processor of a processing unit. Next, transmitting a control to components of the sand removal apparatus based on the co-ordinates for positioning the apparatus relative to the sand accumulation and facilitating removal of sand, by a controller of the controlling unit. Then, moving the sand removal apparatus to the co-ordinates of the region based on the control, by a movable mechanism. Next, rotating a movable arm to an angle relative to the sand accumulation in the region based on the control, by a rotating means. Then, positioning a flexible robotic arm over the sand accumulation in the region, by a retracting means. Finally, suctioning sand through tubes in the flexible robotic arm, thereby facilitating removal of sand from the region, by a vacuum means.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 3 illustrates a flow chart of a method of removal of sand, according to an embodiment herein.

LIST OF NUMERALS

Figure 1A:
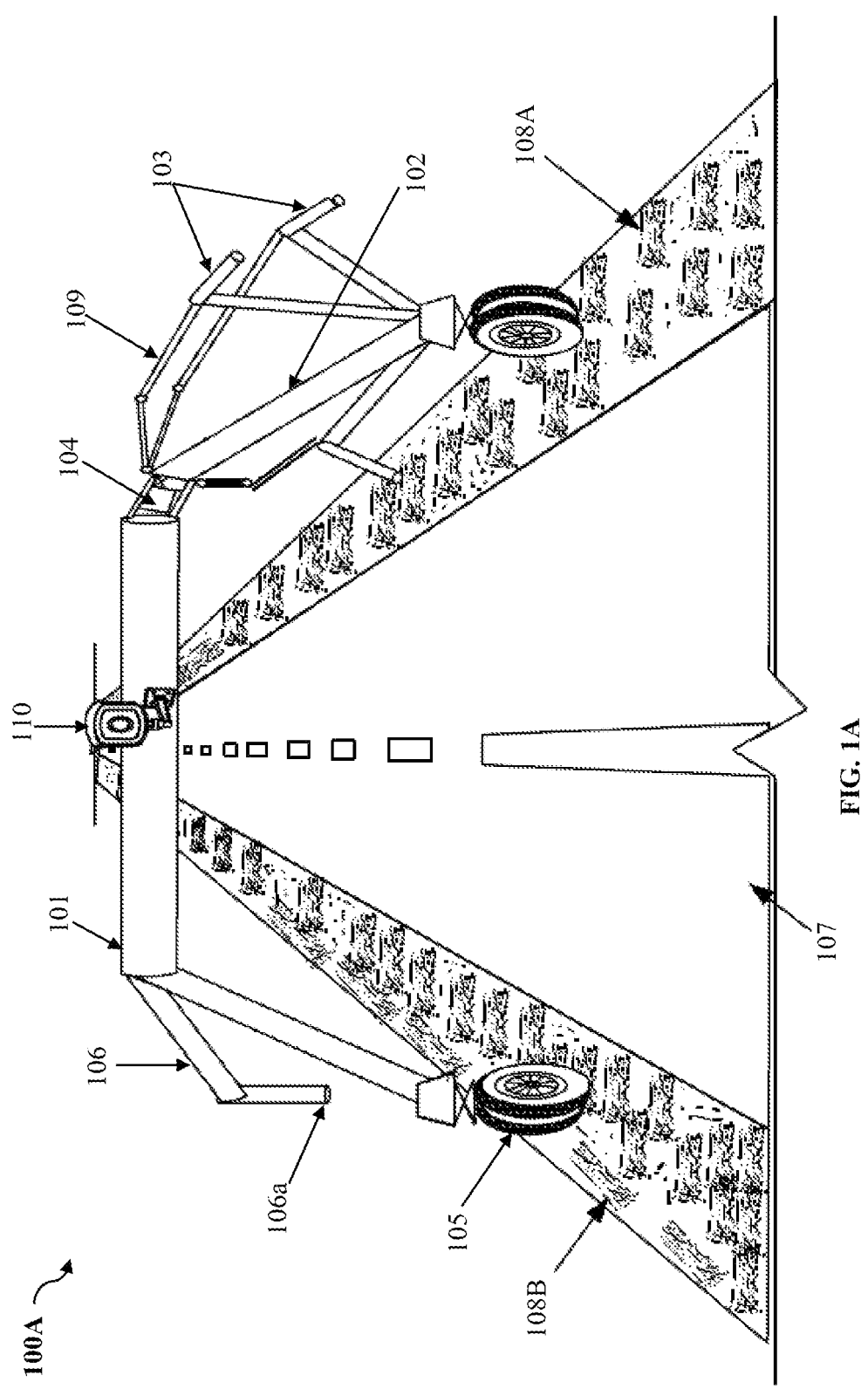
FIG. 1a illustrates an apparatus for removal of sand, according to an embodiment herein.

101-Main arm
102-Movable arm
103-Flexible robotic arm
103a-Tube
103b-Upper arm
103c-Lower arm
104-Rotary motor
105-Movable mechanism
106-Exhaust arm
106a-Exhaust outlet
108a-First region
108b-Second region
109-Retracting mechanism
110-Video capturing means
201-Monitoring unit
202-Controlling unit
203-Rotating means
205-Vacuum means
207-Sensor unit
208-Processing unit
210-Controller

DETAILED DESCRIPTION OF THE PREFERRED EMBODIMENTS

The embodiments herein and the various features and advantageous details thereof are explained more fully with reference to the non-limiting embodiments and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned above, there is a need for an apparatus for an efficient and quick removal of sand for preventing encroachment. Moreover, there is a need for an apparatus and a system utilizing artificial intelligence for safely shifting sand from pathway in a desert region without manual intervention. The embodiments herein achieve this by providing "An Apparatus and System of Sand Removal in a Desert Region". Referring now to the drawings, and more particularly to FIG. 1a through FIG. 3, where similar reference characters denote corresponding features consistently throughout the figures, there are shown preferred embodiments.

FIG. 1a illustrates an apparatus for removal of sand in a desert region. In an embodiment, the apparatus can include but not limited to a main arm 101, at least one movable arm 102, a plurality of flexible robotic arms 103, and a movable mechanism 105.

In an embodiment, the apparatus can be placed on a road or a pathway 107 requiring removal of sand. The main arm 101 can be situated at a height for facilitating movement of vehicles on the road 107.

In an embodiment, a movable arm 102 can be connected to the main arm 101 at one end. In another embodiment, a plurality of movable arms 102 can be connected to the main arm 101 at the end.

In an embodiment, a plurality of flexible robotic arms 103 can be connected to the movable arm 102. In an embodiment, the flexible robotic arms 103 can be provided for removing sand from a first region 108a. The flexible robotic arm 103 can include a suction end. The suction end can include a plurality of vacuum means situated circumferentially for suctioning grains of sand from the area through the flexible robotic arms 103. In an exemplary embodiment, each of the flexible robotic arms 103 can remove 1 m³ of sand from a location.

In an embodiment, the sand from the flexible robotic arm 103 can be transmitted through the movable arm 102 to the main arm 101. The main arm 101 can transmit the sand through the exhaust arm 106 to an exhaust outlet 106a. In an embodiment, the sand can be let out through the exhaust outlet 106a to a second region 108b at another side of the road and/or to a truck.

In an embodiment, the apparatus 100 can be connected to a movable mechanism 105 for facilitating movement relative to the road and/or pathway. The movable mechanism can include but not limited to wheels, continuous track, chain track. The movable mechanism 105 can facilitate movement of the apparatus parallel to the roads.

In an embodiment, the flexible robotic arms 103 can perform suctioning during movement of the apparatus 100.

In an embodiment, a rotary motor 104 is connected to the movable arm 102. The rotary motor 104 can be connected to a joint between the movable arm 102 and the main arm 101. The controller can control the rotary motor for moving the movable arm to the position. In an embodiment, the rotary motor capable of rotating the movable arm at an angle in a range of 1° to 360° relative to the main arm.

In an embodiment, a video capturing means 110 can be mounted on the maim arm 101 of the sand removal apparatus for capturing video of the region to monitor sand accumulations.

Figure 1B:
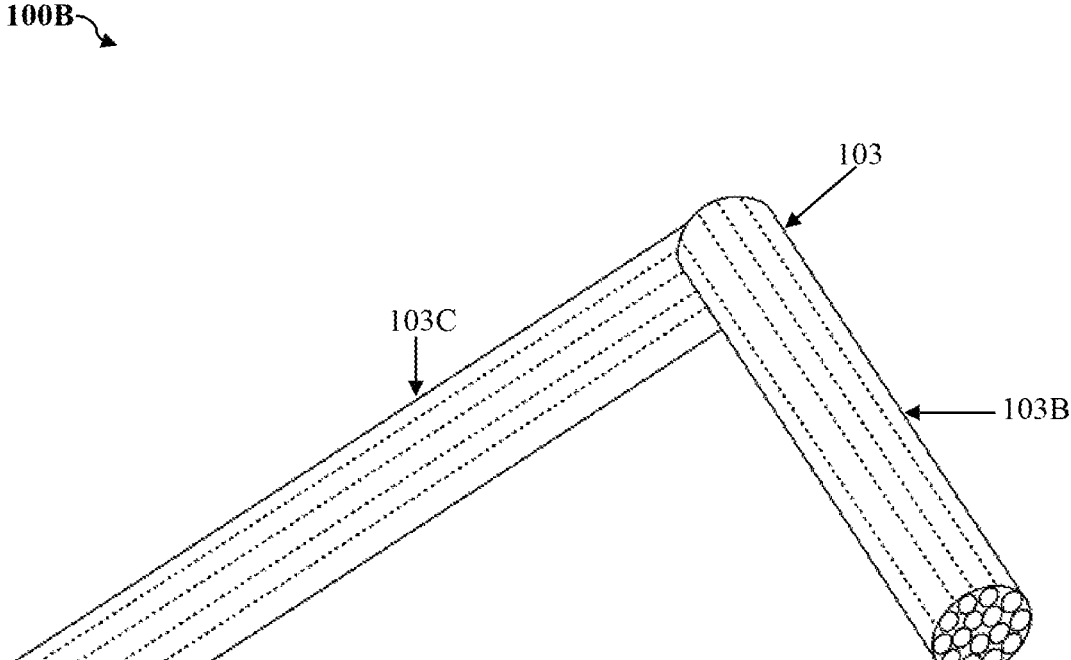
FIG. 1b illustrates a flexible robotic arm of the apparatus for removal of sand, according to an embodiment herein.

FIG. 1b illustrates a flexible robotic arm of the apparatus for removal of sand. In an embodiment, the flexible robotic arm can include an upper arm 103b and a lower arm 103c. The upper arm 103b can be movable relative to the lower arm 103c. In an embodiment, a rotary motor can be connected to the upper arm 103b of the flexible robotic arm 103. The rotary motor can be connected to a joint between the lower arm 103c and the upper arm 103b. The rotary motor can enable rotary movement of the upper arm 103b relative to the lower arm 103c.

In an embodiment, a plurality of tubes 103a extends through the flexible robotic arm. In an embodiment, a vacuum means is connected to the tubes 103a. In an embodiment, a plurality of vacuum means can be connected to the tubes 103a. The vacuum means performs suctioning of sand through the tubes 103a in the flexible robotic arm.

In an embodiment, the tubes 103a in the flexible robotic arm 103 are connected to a tube provide in the movable arm 102. The tube in the movable arm 102 extends through the main arm 101 to the exhaust arm 106. The tube ends at the exhaust outlet 106a. The sand is suctioned from the tubes 103a in the flexible robotic arm 103 to the exhaust outlet 106a, for disposing the sand through the exhaust outlet 106a.

Figure 1C:
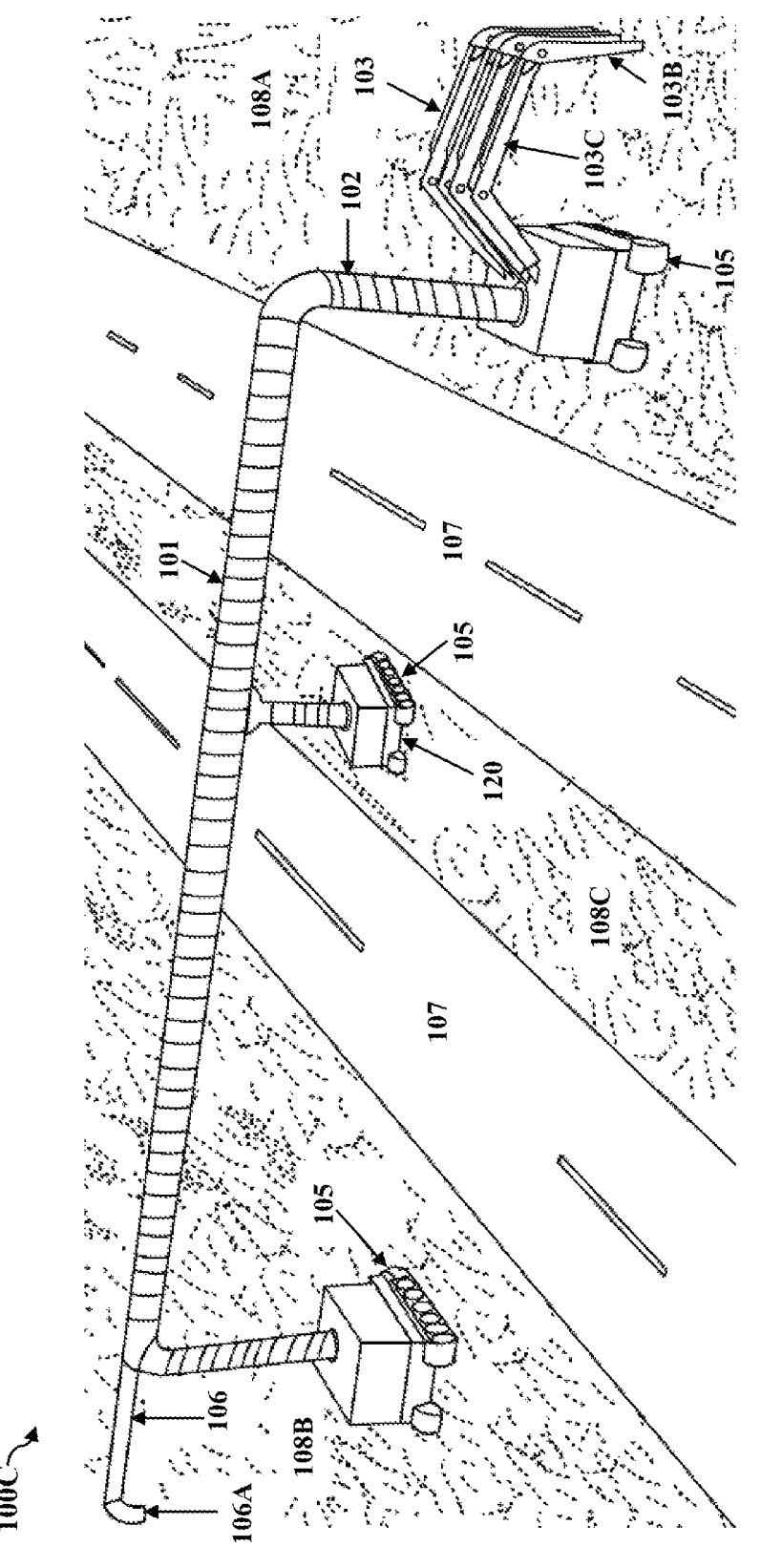
FIG. 1c illustrates an apparatus for removal of sand, according to another exemplary embodiment herein.

FIG. 1c illustrates the apparatus for removal of sand according to another embodiment. In an embodiment, the apparatus can include an intermediate support 120 for supporting the main arm 101 for applications on wide roads with a middle divider region 108c. The intermediate support 120 can be positioned on the middle divider region 108c for supporting the main arm 101 extending from the first region 108a at one end of the road to the second region 108b at another end of the road. The intermediate support 120 can include the movable mechanism 105 for moving along the road 107. The lower arm 103b of the flexible robotic arm 103 can perform removal of sand from the first region 108a through the vacuum means for transporting the sand through the main arm 101 to the exhaust arm 106. The sand can be disposed onto the second region 108b through the exhaust outlet 106a.

Figure 1D:
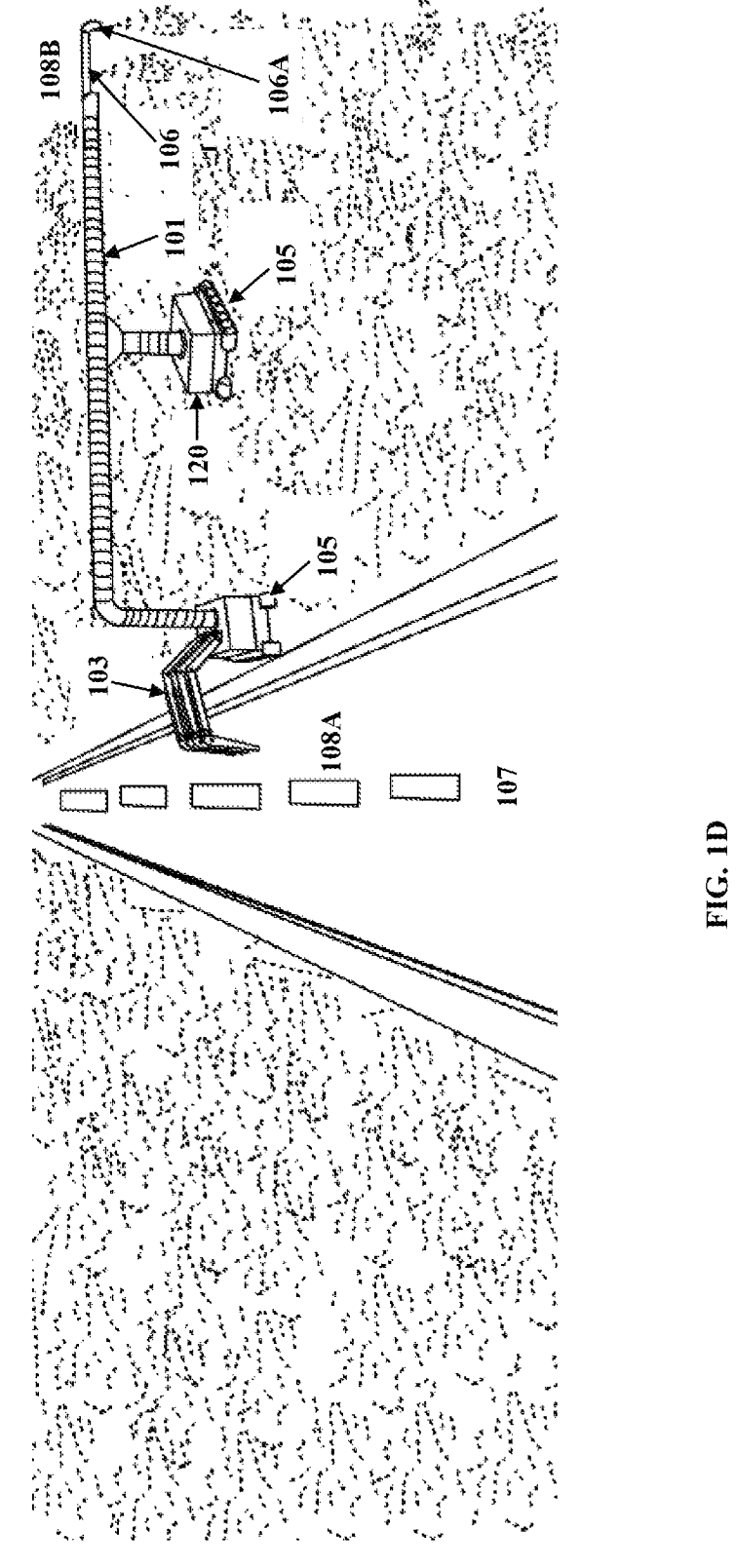
FIG. 1d illustrates a flexible robotic arm of the apparatus for removal of sand, according to another exemplary embodiment herein.

FIG. 1d illustrates the apparatus for removal of sand according to another embodiment. The apparatus can be positioned on the sand for removing sand from the first region 108a on the road 107 and disposing to the second region 108b situated farther on the sand. The apparatus can include the intermediate support 120 with the movable mechanism 105 for moving on the sand along the road 107. The exhaust arm 106 can be connected to another end of the main arm 101 for disposing the sand through the exhaust outlet 106a on to the second region 108b.

Figure 2:
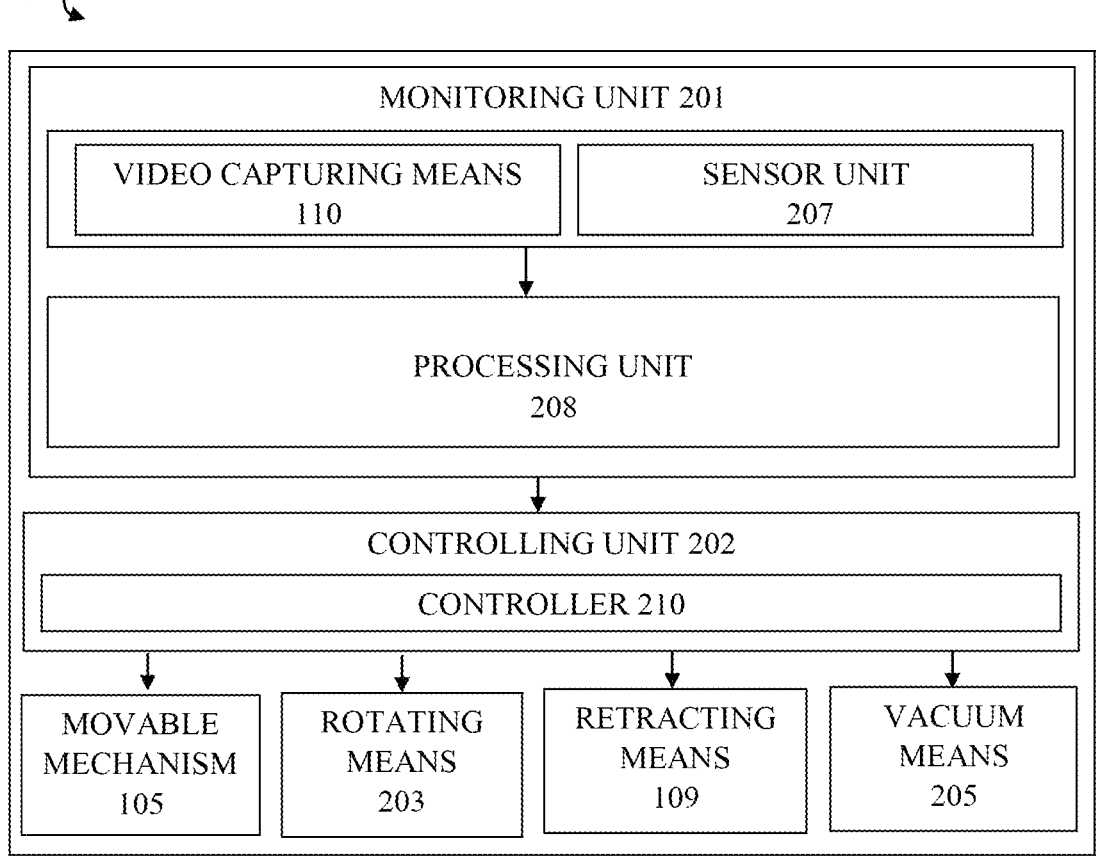
FIG. 2 illustrates a block diagram of a system of removal of sand, according to an embodiment herein.

FIG. 2 illustrates a system of removal of sand from a desert region. In an embodiment, the system can include a monitoring unit 201, a controlling unit 202, a rotating means 203, a retracting means 109, and a vacuum means 205.

In an embodiment, the monitoring unit 201 can be provided for monitoring sand at a region. The monitoring unit 201 can include but not limited to a camera, a drone, a satellite based monitoring system, and a LiDAR system. The monitoring unit 201 can monitor and detect parameters including but not limited to presence of sand at a region, location of the sand, and volume of sand at the location. The parameters detected by the monitoring unit 201 can be transmitted to the controlling unit 202.

In an embodiment, the monitoring unit 201 can include a video capturing means 110 and a sensor unit 207.

The video capturing means 110 can be mounted on the sand removal apparatus for performing real-time monitoring of sand around the apparatus. The video capturing means 110 can be mounted on an unmanned aerial vehicle including a drone for performing monitoring of sand accumulation in a threshold radius around the sand removal apparatus.

The sensor unit 207 can include but not limited to a LiDAR sensor, proximity sensor, IR sensor for monitoring sand accumulation at a region. In an embodiment the sensor unit can be mounted on the sand removal apparatus. In another embodiment, the sensor unit can be mounted at different locations in the region for performing continuous real-time monitoring.

In an embodiment, the video captured by the video capturing means 110 and the parameters detected by the sensor unit 207 can be transmitted to a processing unit 208.

In an embodiment, the processing unit 208 can be connected to the video capturing unit 110 and the sensor unit 208 through a communication network. The communication network can include but not limited to internet, Bluetooth, LoRa.

The processing unit 208 facilitates remote monitoring of sand accumulation at the region.

In an embodiment, the processing unit 208 can be provided as a cloud server. In an embodiment, the processing unit 208 can be provided as a remote computer.

In an embodiment, the processing unit 208 can include a processor and a memory. The memory can be provided for storing instructions for processing data received from the video capturing unit and the sensor unit 207. The processor can execute the processing of the data based on the instructions stored in the memory.

In an embodiment, the processing unit 208 can perform processing to identify sand accumulation in the region from the captured video. The processing unit 208 can identify the sand accumulations and location of the sand accumulations using image processing based on Artificial Intelligence. The processing unit 208 can generate co-ordinates of the region of the identified sand accumulations in the region. The generated co-ordinates can be transmitted to the controlling unit 202.

In an embodiment, the processing unit 208 can identify the sand accumulation and location of the sand location based on data received from the sensor unit 207 including the LiDAR sensor. The processing unit 208 can transmit the co-ordinates of the identified sand accumulations in the region to the controlling unit 202.

In an embodiment, the controlling unit 202 can be provided for controlling the movable mechanism 105, the rotating means 203, the retracting means 109, and the vacuum means 205 based on the parameters detected by the monitoring unit 201. In an embodiment, the controlling unit 202 can include a controller 210. The controller 201 can include but not limited to a microcontroller. The controller 210 can be mounted on the sand removal apparatus. In an embodiment, the controller 210 can be connected to components of the sand removal apparatus including the movable mechanism 105, the rotating means 203, the retracting means 109 and the vacuum means 205. The controller 210 can control the components for positioning the sand removal apparatus relative to the sand accumulations and performing removal of the sand.

In an embodiment, the monitoring unit 201 and the controlling unit 202 can be based on artificial intelligence.

In an embodiment, the controlling unit 202 can control navigation of the apparatus 100 by controlling the movable mechanism based on the parameters detected by the monitoring unit 201.

In an embodiment, the rotating means 104 can be provided at an end of the movable arm 102 connected to the main arm 101. The rotating means 104 can facilitate movement of the movable arm relative to the main arm 101. In an embodiment, the movable arm 102 can move at an angle of 360° relative to the main arm 101. The rotating means 104 can include but not limited to a servo motor.

In an embodiment, the retracting means 109 can be connected to the flexible robotic arm 103. The retracting means 109 can facilitate movement of each of the flexible robotic arm 103 relative to the sand for positioning at a required height. The retracting means 109 can include but not limited to a linkage mechanism, a telescopic mechanism, and a rotary mechanism. In an embodiment, the rotary mechanism can include a string wound to a rotary motor, and an end of the string connected to the flexible rotary arm 103. Rotation of the rotary motor can facilitate upward and downward movement of the flexible robotic arm 103 relative to the first region.

In an embodiment, the vacuum means 205 can include but not limited to a vacuum device for performing suctioning of grains of sand.

In an embodiment, the monitoring unit 201 can be remotely connected to the controlling unit 202.

In an embodiment, the system can be powered through one of solar energy, gasoline, diesel, any renewable energy source.

In a preferred embodiment, the system for removing sand to prevent sand encroachment using the apparatus can include the following. A video capturing means 110 for capturing a video in a region to monitor sand accumulation. The video capturing unit 110 can transmit the captured video to a processing unit 208 through a communication network. The processing unit 208 can identify presence of sand accumulation for defining the first region by determining co-ordinates of the first region for positioning the sand removal apparatus. A controlling unit 202 including a controller 210 can be connected to the monitoring unit 201 through a communication network. The controller 210 can control the movable mechanism 105, the rotating means 203, and the retracting means 109 for positioning the apparatus relative to the first region 108a based on the co-ordinates received from the processing unit 208. The movable mechanism 105 can move the apparatus to the co-ordinates of the first region 108a based on control received from the controller 210. The rotating means 203 can rotate the movable arm 102 for positioning relative to the sand accumulation based on control received from the controller 210. The retracting means 109 can move the flexible rotating arm 103 for positioning over the sand accumulation based on control received from the controller 210. A vacuum means 205 can be controlled by the controller 210 for switching ON and suctioning sand from the sand accumulation at the first region, thereby removing sand from the first region. The processing unit 208 can include a processor and a memory for performing image processing to identify presence of sand accumulation in the captured video and defining determining co-ordinates of the first region. The processing unit can include a LiDAR sensor for identifying presence of sand accumulations, and location of the sand accumulation in the region. The communication network including but not limited to internet.

FIG. 3 illustrates a method for removal of sand from a desert region. In an embodiment, the method can include the following steps. First, capturing 301 a video of a region for identifying presence of sand accumulation, by a video capturing means. Then, identifying 302 co-ordinates of the region of the sand accumulation based on the captured video, by a processor of a processing unit. Next, transmitting 303 a control to components of the sand removal apparatus based on the co-ordinates for positioning the apparatus relative to the sand accumulation and facilitating removal of sand, by a controller of the controlling unit. Then, navigating and moving 304 the sand removal apparatus to the identified co-ordinates of the region based on the control, by a movable mechanism. Then, rotating 305 a movable arm to an angle relative to the sand accumulation in the region based on the control, by a rotating means. Next, positioning 306 a flexible robotic arm over the sand accumulation in the region, by a retracting means. Finally, suctioning 307 sand through tubes in the flexible robotic arm, thereby facilitating removal of sand from the region, by a vacuum means.

In an embodiment, the sand transmitted through the tubes 103a from the flexible robotic arm 103 to the exhaust outlet 106a through the movable arm 102, main arm 101 and the exhaust arm 106.

A main advantage of the present disclosure is that the apparatus and system facilitates removal of sand from a location in a desert region.

Another advantage of the present disclosure is that the apparatus and system facilitates faster and efficient removal of sand thereby preventing sand encroachment.

Still another advantage of the present disclosure is that the apparatus and system facilitates removal of sand by utilizing artificial intelligence.

Yet another advantage of the present disclosure is that the apparatus and system provides autonomous operation for removal of sand.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

I claim:

1. An apparatus for removing sand to prevent sand encroachment, comprising: a main arm (101) extending between a first region (108a) and a second region (108b); a movable arm (102) connected to a first end (101a) of the main arm (101), wherein the movable arm (102) rotatable relative to the main arm (101); a plurality of flexible robotic arms (103) connected to the movable arm, wherein the flexible robotic arms (102) extend over the first region to remove sand; a tube (103a) extending internally through each of the flexible robotic arms (103), wherein the plurality of tubes connected to a single tube extending internally through the movable arm (102), the main arm (101), and an exhaust arm (106); a controller operatively connected to the movable arm (102) and the flexible robotic arms (103) for controlling position of the movable arm (102) and the flexible robotic arms (103) relative to the first region (108a); a vacuum means fixed in the tubes (103a) of the flexible robotic arms (103) for generating vacuum to remove sand from the first region; wherein the sand transferred through the tubes (103a) from the flexible robotic arms (103) to the exhaust arm (106); and the exhaust arm (106a) connected to the second end (101b) of the main arm (101), wherein the tube in the exhaust arm releasing the sand to the second region (108b), thereby preventing sand encroachment.

2. The apparatus as claimed in claim 1, wherein a rotary motor operatively connected to the movable arm (102); and wherein the controller controlling the rotary motor for moving the movable arm (102) relative to the main arm (101).

3. The apparatus as claimed in claim 1, wherein the rotary motor capable of rotating the movable arm at an angle in a range of 1° to 360° relative to the main arm.

4. The apparatus as claimed in claim 1, wherein the robotic flexible arms (103) include an upper arm (103b) and a lower arm (103c), wherein the upper arm (103b) movable relative to the lower arm (103c).

5. The apparatus as claimed in claim 4, wherein a rotary motor operatively connected to the upper arm (103b) of the flexible robotic arms (103), wherein the rotary motor enabling rotary movement of the upper arm (103b) relative to the lower arm (103c).

6. The apparatus as claimed in claim 1, wherein a retracting means (109) connected to the flexible robotic arms (103) for controlling movement of the flexible robotic arms (103) relative to the movable arm (102) for positioning the flexible robotic arms (103) over the first region (108a).

7. The apparatus as claimed in claim 6, wherein the retracting means (109) including but not limited to a telescopic arm and rotary mechanism.

8. The apparatus as claimed in claim 7, wherein the rotary mechanism including a string wound to a rotary motor, and an end of the string connected to the flexible rotary arms (103), and wherein rotation of the rotary motor facilitating upward and downward movement of the flexible robotic arms (103) relative to the first region.

9. The apparatus as claimed in claim 1, wherein a movable mechanism (105) connected to ends of the movable arm (102) for moving the apparatus and positioning along the first region (108a) and the second region (108b); and wherein the movable mechanism (105) can include but not limited to wheels, chain track wheels.

10. A system for removing sand to prevent sand encroachment using the apparatus as claimed in claim 1, comprising:

a video capturing means (110) for capturing a video in a region to monitor sand accumulation, wherein the video capturing unit (110) transmitting the captured video to a processing unit (208) through a communication network;

the processing unit (208) identifying presence of sand accumulation for defining the first region by determining co-ordinates of the first region for positioning the apparatus;

a controlling unit (202) including a controller (210) connected to the monitoring unit (201) through a communication network;

wherein the controller (210) controlling the movable mechanism (105), the rotating means (203), and the retracting means (109) for positioning the apparatus relative to the first region (108a) based on the co-ordinates received from the processing unit (208);

wherein the movable mechanism (105) moving the apparatus to the co-ordinates of the first region (108a) based on control received from the controller (210);

wherein the rotating means (203) rotating the movable arm (102) for positioning relative to the sand accumulation based on control received from the controller (210);

wherein the retracting means (109) moving the flexible rotating arm (103) for positioning over the sand accumulation based on control received from the controller (210); and a vacuum means (205) controlled by the controller (210) for switching ON and suctioning sand from the sand accumulation at the first region, thereby removing sand from the first region.

11. The system as claimed in claim 10, wherein the processing unit (208) including a processor and a memory for performing image processing to identify presence of sand accumulation in the captured video and defining determining co-ordinates of the first region.

12. The system as claimed in claim 10, wherein the processing unit (208) including a LiDAR sensor for identifying presence of sand accumulations, and location of the sand accumulation in the region.

13. The system as claimed in claim 10, wherein the communication network including but not limited to internet.

\*  \*  \*  \*  \*